A. W. LEWIS.
CORN PLANTER.
APPLICATION FILED MAR. 26, 1908.

910,297.

Patented Jan. 19, 1909.

2 SHEETS—SHEET 1.

Witnesses:
Theo. Lagaard
H. A. Bowman

Inventor:
Albert W. Lewis
By P. H. Gunckel
his Attorney.

A. W. LEWIS.
CORN PLANTER.
APPLICATION FILED MAR. 26, 1908.
910,297. Patented Jan. 19, 1909.
2 SHEETS—SHEET 2.
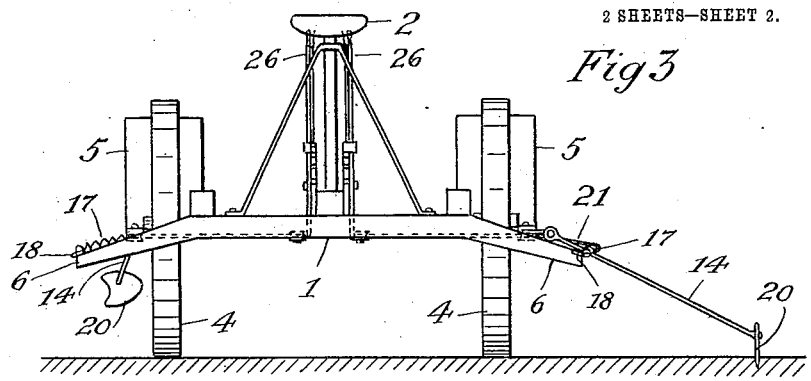
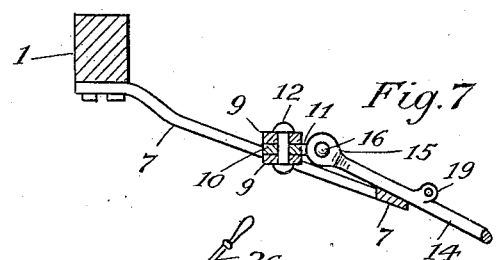
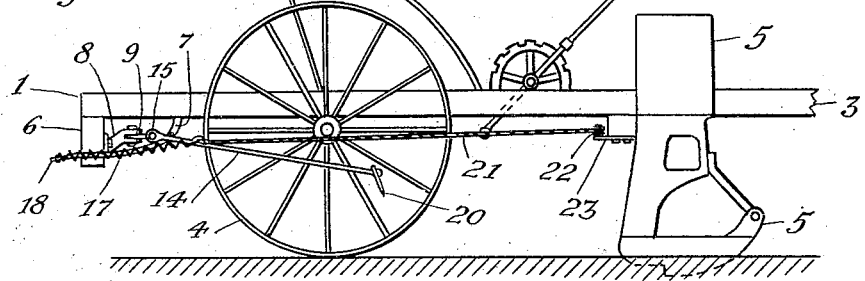
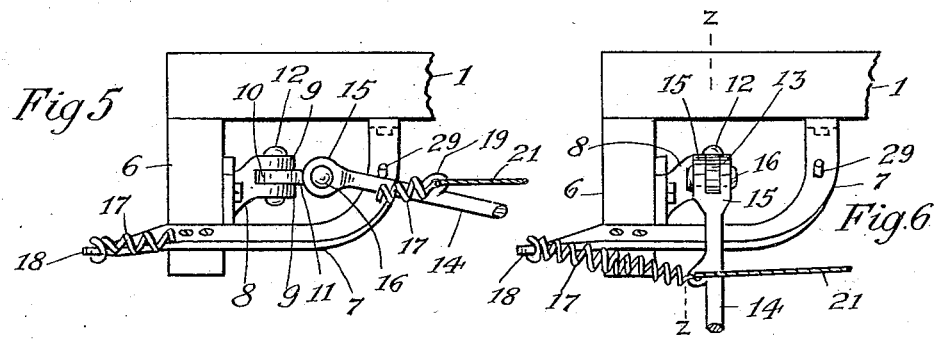
Witnesses:
Inventor
Albert W. Lewis.
By P. H. Funckel
his Attorney.

UNITED STATES PATENT OFFICE.

ALBERT W. LEWIS, OF WENDELL, MINNESOTA.

CORN-PLANTER.

No. 910,297.   Specification of Letters Patent.   Patented Jan. 19, 1909.

Application filed March 26, 1908. Serial No. 423,289.

*To all whom it may concern:*

Be it known that I, ALBERT W. LEWIS, a citizen of the United States, residing at Wendell, in the county of Grant and State of Minnesota, have invented certain new and useful Improvements in Corn-Planters, of which the following is a specification.

My invention relates to corn planters, and particularly to the ground markers employed on such machines; and its object is to improve the means for operating the marker at either side of the machine as desired.

It is customary to provide a corn planter with a marker carried by a pole or rod that is attached to one side of the machine during one course of movement and is then detached and connected by the operator to the other side for the return course and in each case marks the ground for the return bout. This change of the marker device from side to side of the machine is laborious and causes some delay.

The purpose of my improvement is to provide a marker for each side of the machine and suitable levers and connections to enable the operator to alternately move them to and from operative positions readily and with little effort.

My improvements are illustrated in the accompanying drawings, in which—

Figure 1:
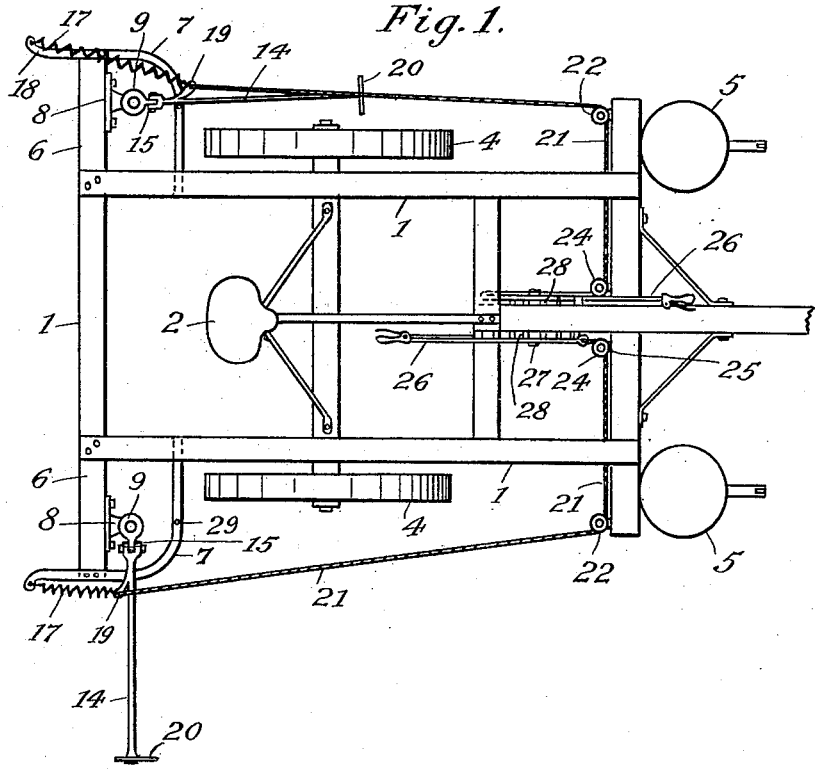
Figure 2:
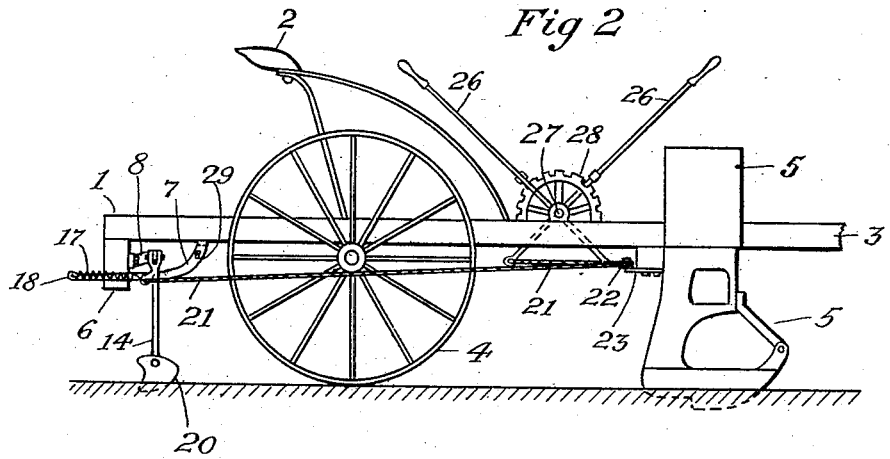

Figure 1 is a plan view of a common form of corn planter equipped with my improved marker devices, showing the marker at the one side in operative position and that at the other side elevated to inoperative position; Fig. 2 is a side elevation and Fig. 3 a rear elevation of Fig. 1; Fig. 4 is a side elevation, similar to Fig. 2 but showing both markers lifted from the ground; Figs. 5 and 6 are enlarged detail views of the frame portions and connections which carry the markers; and Fig. 7 is a cross-section on the line z—z of Fig. 6.

The corn planter illustrated is of ordinary construction, comprising a frame 1, on which is mounted a driver's seat 2; a rigid draft-pole 3; wheels 4; and suitable corn-discharging devices 5.

For supporting the marker devices the rear cross-piece of the frame 1 has outwardly and downwardly extending portions 6, and curved downwardly inclined braces 7 connect the extensions 6 with the longitudinal bars of the frame. To the extensions 6 are bolted brackets 8 on which are provided hinge-knuckles 9 adapted to receive between them the eye portion 10 of a short leaf 11, and a pintle 12 to connect the hinge members and allow the leaf to turn in a nearly horizontal plane. The forward end of the leaf 11 has an eye 13 at right angles to the eye 10 and the marker pole or outrigger 14 is provided with a pair of knuckles 15 which are connected to the eye 13 by a pintle 16, whereby the pole is permitted to swing in an approximately vertical plane. This construction and arrangement adapts the marker pole to be moved along the surface of the inclined brace 7 to and from operative position.

The marker poles may be moved by the following means. A coil spring 17, having one end attached to a rearward extension 18 of the brace 7 and the other end attached to a lug 19 on the pole, serves to swing the pole rearward and downward to position to cause the marker 20 to contact with the ground; that is, from the position shown at the top of Fig. 1 to that shown at the opposite side of that figure. To the pole lug 19 is fastened the end of a rope or cord 21 which extends thence over a pulley 22 provided on a bracket 23 attached to the front cross-piece of the frame, and extends thence along the side of the cross-piece and over a second pulley 24 on a bracket 25 provided near the middle of the cross-piece, and extends thence rearward and has its end attached to the lower arm of a hand-lever 26. This lever is fulcrumed at 27 to the side of the rear portion of the tongue 3, and a notched segment 28 is provided for locking the lever at different points, in the usual way. The lever is placed in convenient reach of a driver on the seat 2, to enable him to swing the lever and move the marker pole to and from working position. A stud or stop 29 on the brace 7 limits the inward movement of the pole to prevent the marker from coming in contact with the wheel.

From the foregoing the operation of the devices is probably obvious. To put the marker on the off side at work and move the other marker to its elevated position the driver pulls the right hand lever toward him, which allows the spring 17 at that side to lower the marker, and pushes the left hand lever forward, as illustrated in Fig. 2. And for the return trip he reverses the positions of the two levers.

Having described my invention, what I claim and desire to secure by Letters Patent is—

1. The combination with a corn planter, of markers connected to its opposite sides, springs for moving them to working positions, and levers and connections for retracting them from such positions, substantially as set forth.

2. The combination with a corn planter, of a marker and its carrier at each side, a joint for such carrier permitting movements in inclined directions, and an operating lever and connections for controlling the carrier movements, substantially as set forth.

3. The combination with a corn planter, of a marker and its carrier at each side, a joint for such carrier permitting it to be moved upward and downward and inward and outward, an inclined guide therefor, and an operating lever and connections for controlling the carrier movements, substantially as set forth.

4. The combination with a corn planter, of a marker and its carrier at each side, a joint for such carrier permitting it to be moved upward and downward and inward and outward, an inclined guide therefor, a spring for moving it downward and outward, and a lever and connections for moving it upward and inward, substantially as set forth.

In testimony whereof I have signed my name to this specification in the presence of two subscribing witnesses this 16th day of March, 1908.

ALBERT W. LEWIS.

Witnesses:
ED. J. PLETAN,
GUNDER PLETAN.